3,446,660
HIGH TEMPERATURE MAGNET WIRE
Wesley W. Pendleton, Muskegon, Mich., assignor to Anaconda Wire and Cable Company, New York, N.Y., a corporation of Delaware
No Drawing. Continuation-in-part of application Ser. No. 173,115, Feb. 14, 1962. This application July 27, 1965, Ser. No. 475,273
Int. Cl. B44d 1/18, 1/30
U.S. Cl. 117—218                2 Claims

ABSTRACT OF THE DISCLOSURE

Abrasive resistance of high temperature magnet wires of the type provided with an insulation coating of organic varnish pigmented with finely divided glass can be substantially improved by coating thereon a layer of polyamide varnish to a thickness less than 0.3 mil. The polyamide coating is capable of pyrolytic decomposition at a high temperature without carbonaceous residue.

---

This application is a continuation-in-part of application Ser. No. 173,115, now U.S. Patent 3,273,225 which in turn is a continuation-in-part of Ser. No. 763,187, now abandoned.

This invention relates to magnet wires and the method for producing the same. More particularly, it relates to magnet wires of the type suitable for high temperature application, such as in the manufacture of insulated electromagnetic windings which are capable of being continuously operated at temperatures of 500° C. or higher and which may be successfully employed in electric generators, motors, and other electromagnetic apparatus designed for service at high temperatures.

Magnet wires of this type are generally manufactured by coating on an electrical conductor an organic varnish pigment with one or more inorganic insulation materials, such as finely divided glass. The resultant magnet wire can then be used to form electromagnetic windings or other desired configurations. After the winding has been formed, it is heated to a temperature above the pyrolysis point of the organic varnish for a sufficient period of time to pyrolytically volatilize all organic matter from the covering and leave the winding insulated solely by the inorganic dielectric material. Because the final insulation is inorganic in nature and because it is thermally stable at temperatures of 500° C. or higher, electromagnetic windings of this type can be successfully used in electromagnetic apparatus or machines designed to operate at such temperatures.

The organic-inorganic coatings on the metallic conductors must possess sufficient hardness and toughness to withstand the abrasive binding stresses and heavy pressure normally encountered during the winding operation without breaking, cracking or otherwise being disrupted from the conductor. These coatings must also have good firing characteristics which upon heating to its decomposition temperature are clean-burning and can be substantially removed by volatilization from the applied coating without leaving any trace of carbonaceous residue on the resultant inorganic insulation. A number of polymeric resins are found to be suitable for preparing the organic-inorganic formulation for conventional electromagnetic windings designed for high temperature application. Among them are the polyester and the silicone resins. Both possess excellent firing characteristics and have sufficient flexibility and abrasive resistance.

The trend in modern engineering design is subminiaturization, particularly in the aerospace industry. Finer high-temperature magnetic wires with thinner insulation are required for the smaller electrical components. The organic resins commonly used to combine the inorganic materials into the electrical conductors lack the required abrasive resistance for tighter windings and other factors contributed by subminiaturization. The use of higher abrasive resistant organic resins have not been successful. The failures are contributed by many factors. Among them are the poor burning characteristics of the higher abrasive resistant resins. In the case of the polyamide resin, excessive carbonaceous residue after pyrolytic decomposition renders it completely unsuitable as an organic varnish for binding the inorganic materials into the wire. However, I have found that the magnet wire of this type, which has an insulation of an organic varnish pigmented with finely divided glass, when provided with an abrasive resistant jacket of polyamide varnish with a thickness less than 0.3 mil has substantially improved abrasive resistance without sacrificing the burning characteristics of the original magnet wire. The improved magnet wire of this invention can be subsequently used for electromagnetic windings and pyrolytically volatilized without carbonaceous residue even at deep windings.

A number of polyamide resins are found to be suitable for the present invention. Notable among them are nylon-6,6, nylon-6,10, nylon-6, self-condensation products of 11-aminodecanoic acid, high molecular polymers prepared from polymerized unsaturated fatty acids, and polyamino compounds and their copolymers. The polymeric varnish is coated on the magnet wire preferably by first dissolving it into an organic solvent to make up the coating solution. Commercial solvents, such as phenol, m-cresol, xylenol, formic acid, and cresylic acid or mixtures of two or more solvents are found to be suitable.

The abrasive resistance of all high temperature magnet wires insulated with a coating of organic varnish pigmented with inorganic materials, such as glass, can be substantially improved by the method of this invention. One of such magnet wires, for example, is disclosed in the copending U.S. patent application Ser. No. 173,115, now U.S. Patent 3,273,225, filed Feb. 14, 1962. The magnet wire, in accordance with the earlier patent application, is produced by applying to an oxidation resistant bimetallic conductor (e.g., a copper conductor clad with nickel, aluminum or stainless steel) one or more coatings of a slurry of fusable inorganic particles suspended in an organic resinous solution in the conventional manner with a ball or grooved die. When multiple coats are used, they are applied interspersed with oven baking steps in a continuous operation.

The slurry consists of a liquid polyester modified diphenyl siloxane (silicon resin) pigmented in a 4:1 resin to pigment ratio by weight, with finely divided inorganic material. This finely-divided inorganic material is preferably formed from a low melting borosilicate type glass and is preferably in either a flake, powder or finely divided fiber form. A suitable barium borosilicate glass has the following composition:

| | |
|---|---|
| $SiO_2$ | 27.7 |
| $CaF_2$ | 6.4 |
| ZnO | 5.30 |
| CaO | 4.5 |
| BaO | 17.2 |
| $Na_2O$ | 11.7 |
| $B_2O_3$ | 26.3 |

The glass is obtained in a felt-like sheet formed of fibers which are initially 1 micron or less in diameter and approximately 1 mil long. The felt is cut into strips and admitted to a pebble mill with xylol. The glass is milled in the ceramic barrel of the pebble mill for approximately 3-4 days until the average length of the glass fibers is 2–

5 microns. This grinding does not affect the cylindrical or fibrous nature of the glass; it only shortens the fiber lengths.

The glass fibers in a range of from 0.05 to 1.0 micron in diameter and 1–10 microns in length depending on the diameter (the ratio of length to diameter being approximately 10:1) allows the formation of a mat structure (similar to paper) in spite of the reduced length of the fibers. This mat structure effect is found to be especially desirable in that it lessens the tendency of the finely divided glass to fall off the wire in the pyrolysis operation where the resin is burned off.

The resultant magnet wire is coated with one or two layers of nylon enamel. A typical enamel that is suitable for the present invention, for example, is nylon-6,6 dissolved in phenols. The amount of nylon in phenols can range from 6% to about 35% by weight. Equally suitable are other types of polyamide resins as previously stated. The resins when used are also preferably dissolved in a suitable solvent. The nylon coated wire can be wound into a coil with or without application of potting cement. It is dried as wound.

The coil is fired in steps of 250° C. and 500° C. for ¼ hour in a pyrolysis process in which the resin is burned off without carbonaceous residues. The coil is further heated to 650° C. for ½ hour whereby the glass particles are fused and form a mass of glass insulation between the interstices of the adjacent conductors.

In another example, a mixture of 380 grams of flint, 417 grams of barium carbonate, 170 grams of potassium carbonate, 100 grams of sodium carbonate (containing one water of crystallization), 49 grams of lithium carbonate, 80 grams of zinc oxide, 20 grams of calcium fluoride, 5 grams of cobalt oxide, and 5 grams of nickel oxide are mixed together and are gradually (250° C. per hour) fired to the melting and pouring temperatures of 750° C. for four hours. Subsequently, the melt is quenched in cold water and the shattered frit is dried and mixed with 20% chrome oxide and dry ball-milled with aluminum pebbles until the powder passes 200 mesh. The powder is then mixed in the ratio of 0.8 by weight of powder to 1.0 of dry resin in 40% solids solution (diphenyl siloxane modified with terephthalic polyester) and further ball-milled for 48 to 72 hours. This slurry is applied to nickel-clad wire of several types and baked at 325° C. for 10 seconds each coat (2 to 4 coats) for fine wire, e.g., #30 AWG, and for up to 30 seconds per coat for heavy wire, e.g., #18 AWG. The coated magnet wire is covered with one or two coats of nylon enamel (22% nylon-6,6 in a mixture of phenols). The resulting wire can be wound into a coil with or without application of potting cement and dried as wound. The coil is then fired in steps of 250° C., 500° C., and 700° C. in the presence of air for ½ hour, 20 minutes, and 15 minutes, respectively. Times are proportionately lengthened for coils larger than one ounce.

It was found that the magnet wires prepared in accordance with the examples described can be used in much smaller coil than heretofore possible. For example, a #30 size high temperature magnet wire, as prepared in the second example, was used in an extremely small motor stator (1″ dia. x ¾″ long with I.D. of ½″). No cracking or otherwise rupture of the coating was observed, and the fired stator contained no carbonaceous residue. Similar magnet wire without a nylon overcoat produces excess trouble due to the lack of abrasion resistance. Wires as fine as #40 with excellent abrasion resistance have been produced in accordance with the teaching of this invention. I have also found that by using the nylon overcoat larger size high temperature magnet wire can be made which still possesses the required abrasion resistance for subsequent winding operations.

I claim:

1. In a magnet wire of the type suitable for high temperature application having an insulation coating of organic varnish pigmented with finely divided glass on an oxidation resistant electrical conductor, the improvement in combination therewith comprising an abrasive resistant jacket of polyamide varnish on said insulation coating, said jacket having a thickness in the range between about 0.1 and about 0.3 mil and capable of being pyrolytically decomposed at a high temperature without carbonaceous residue, said polyamide varnish being selected from a group of polymers consisting of nylon-6,6, nylon-6,10, and nylon-6, dissolved in vaporizable solvent.

2. In a magnet wire of the type suitable for high temperature application having an insulation coating of organic varnish pigmented with finely divided glass on an oxidation resistant electrical conductor, the improvement in combination therewith comprising an abrasive resistant jacket of polyamide varnish on said insulation coating, said jacket having a thickness in the range between about 0.1 and about 0.3 mil and capable of being pyrolytically decomposed at a high temperature without carbonaceous residue, said varnish being prepared from nylon-6,6 dissolved in an organic solvent selected from a group consisting of phenol, m-cresol, xylenols, formic acid, and cresylic acid.

References Cited

UNITED STATES PATENTS 3,089,787   5/1963   Sattler et al. _____ 117—232 X
3,222,219   12/1965  Saunders et al. ____ 117—218 X ALFRED L. LEAVITT, *Primary Examiner.*

A. GOLIAN, *Assistant Examiner.*

U.S. Cl. X.R.

117—231, 232; 174—120